United States Patent [19]

Glorioso

[11] Patent Number: 4,594,495
[45] Date of Patent: Jun. 10, 1986

[54] STUD WELDING APPARATUS WITH TWO-WIRE CONTROL

[75] Inventor: Paul A. Glorioso, Amherst, Ohio

[73] Assignee: TRW Inc., Cleveland, Ohio

[21] Appl. No.: 708,764

[22] Filed: Mar. 6, 1985

Related U.S. Application Data

[63] Continuation of Ser. No. 521,434, Aug. 8, 1983, abandoned.

[51] Int. Cl.$^4$ ............................................. B23K 9/20
[52] U.S. Cl. .................................................... 219/98
[58] Field of Search .................................. 219/98, 99

[56] References Cited

U.S. PATENT DOCUMENTS

| | | | |
|---|---|---|---|
| 3,679,860 | 7/1972 | Spisak | 219/98 |
| 3,826,893 | 7/1974 | Glorioso | 219/98 |
| 3,909,694 | 9/1975 | Yokota et al. | 219/98 X |
| 4,132,879 | 1/1979 | Glorioso | 219/98 |
| 4,297,560 | 10/1981 | Netzsch | 219/98 |

FOREIGN PATENT DOCUMENTS

| | | | |
|---|---|---|---|
| 862282 | 1/1971 | Canada | 219/98 |
| 2042391 | 9/1980 | United Kingdom | 219/98 |

Primary Examiner—Clarence L. Albritton
Assistant Examiner—Catherine M. Sigda
Attorney, Agent, or Firm—Allen D. Gutchess, Jr.

[57] ABSTRACT

Apparatus for welding studs utilizing a two-wire control is provided. The apparatus includes a stud welding tool capable of welding studs by a drawn-arc technique. A stud welding control circuit and a source of welding power are remotely located from the tool with the difference exceeding one hundred feet in some applications. Heretofore, two wires were required to connect the tool and the control circuit to initiate the welding cycle and two additional wires were required to control movement of the stud during the welding cycle independently of the position of a start switch on the tool after the switch is closed. The present apparatus requires only two wires to both initiate and control the weld cycle. This reduces costs and maintenance and increases reliability and maneuverability of the tool.

14 Claims, 1 Drawing Figure

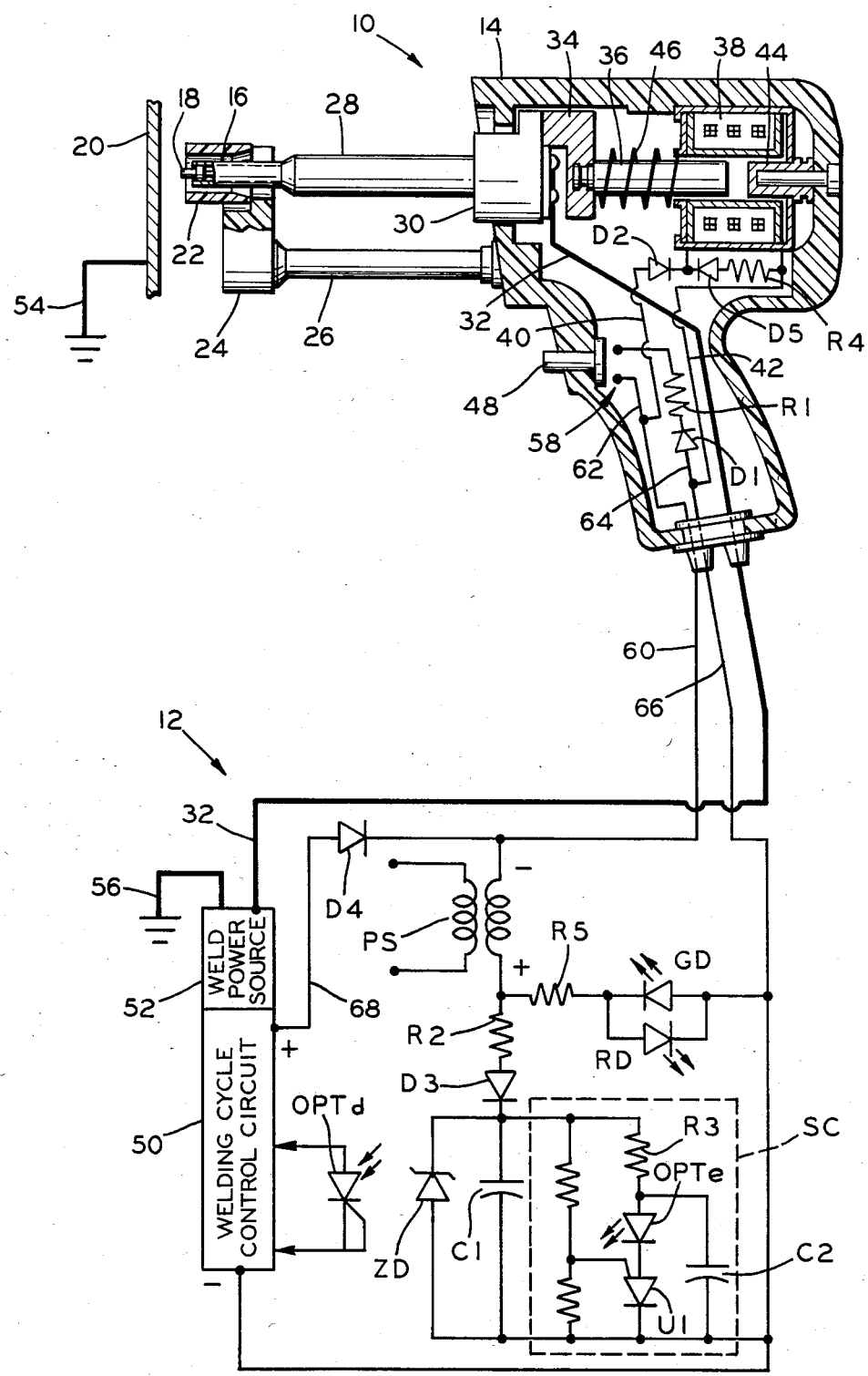

STUD WELDING APPARATUS WITH TWO-WIRE CONTROL

This is a continuation of application Ser. No. 521,434 filed Aug. 8, 1983, now abandoned.

This invention relates to stud welding apparatus employing only two control wires between the stud welding tool and the remote controls for the welding cycle.

In a drawn-arc stud welding technique, the stud to be end welded to a workpiece is held by a chuck generally perpendicular to the workpiece and is pressed against the workpiece. The stud is held by a chuck leg of a stud welding tool which also has a supporting leg carrying a welding foot which positions a spark shield or ferrule around the stud and in contact with the workpiece. A trigger on the welding tool is then pressed to close a start switch and to start the welding cycle which proceeds completely automatically. A solenoid coil in the tool is energized to draw a core into the coil and cause the chuck to retract the stud from the workpiece. At that time, a pilot arc is established between the stud and the workpiece and a main welding arc is subsequently imposed on the pilot arc. When the coil is deenergized, a plunge spring moves the stud against the workpiece with the welding arc usually maintained until the stud contacts the workpiece. Molten metal on the stud end and the workpiece then solidify to complete the weld.

Heretofore, four control wires usually have been employed between the welding tool and the controls which are remotely located in a suitable enclosure along with a source of power for the welding arc. Two wires were required between the start switch of the welding tool and the remote controls to initiate the welding cycle and two wires were necessary to effect movement of the stud during the welding cycle. Further, the welding cycle must proceed independently of the condition of the start switch so that the timing of the cycle is independent of the operator.

Two control wires between the welding tool and the welding controls have been shown in earlier patents, but in those patents certain steps of the welding cycle were dependent on the condition of the start switch as controlled by the operator. Thus, in Nelson U.S. Pat. No. Re-22,310, issued May 11, 1943, the weld current stayed on until the trigger was released. In Jones U.S. Pat. No. 2,942,096, issued June 21, 1960, the trigger for the start switch had to be released before the stud would plunge against the workpiece. The inherent variables in stud welding cycles controlled in these manners may have been tolerable for long welding cycles but are completely unsatisfactory for more recent welding cycles, particularly for smaller studs, which usually last a fraction of a second. Two wires were also used in early stud welding tools where the solenoid coil was in series with the welding current cable but this had several disadvantages, including heat build-up and use of limited welding current. Three wires were also used to a limited degree on D. C. equipment but extensive damage would result if the wires were connected wrong.

The present invention provides a two-wire control system between a stud welding tool and remotely-located controls wherein the two wires are effective to initiate a welding cycle upon the closing of a start switch at the welding tool and to then connect the tool and the remote controls to effect the movement of the stud during the welding cycle independently of the condition of the start switch. The use of only two wires and the elimination of an additional two accordingly reduces costs of the equipment, particularly in some applications as in construction where the distance between the tool and the controls may exceed one hundred feed. The elimination of two of the wires also increases maneuverability of the tool and decreases maintenance costs in the event of damage to the wires. The use of only two wires in place of three or four also accordingly reduces the chances of an improper connection of the wires by an operator, which can result in damage to the controls.

It is, therefore, a principal object of the invention to provide stud welding apparatus in which only two control wires are employed between a stud welding tool and the welding controls for the purpose of initiating and controlling the welding cycle.

Another object of the invention is to provide two-wire controls for use in a stud welding circuit wherein the stud welding cycle proceeds independently of the condition of a start switch of a welding tool.

A further object of the invention is to provide a stud welding system which is less expensive, and reduces the possibility of improper connection of control wires of the system.

Yet another object of the invention is to provide a two-wire control for a stud welding system which increases maneuverability of the stud welding tool and reduces maintenance.

Many other objects and advantages of the invention will be apparent from the following detailed description of a preferred embodiment thereof, reference being made to the accompanying drawing, in which:

The single FIGURE is a schematic and a diagrammatic view of a stud welding system embodying the invention including a stud welding tool and remote controls with two control wires connecting the tool and the controls.

Referring to the drawing, a stud welding tool embodying the invention is indicated at 10 and remotely located welding controls are indicated at 12. The welding tool 10 includes a main housing 14 of dielectric material which usually is made of several separate components. A chuck 16 is located at the forward end of the tool and holds a stud 18 which is to be welded to a workpiece 20. A suitable spark shield 22 is located around the stud 18. The shield is positioned so that the end of the stud protrudes slightly beyond the shield prior to the end of the stud being pressed against the workpiece in order to assure that the stud is initially in good electrical contact with the workpiece. The spark shield 22 is supported and positioned by means of a supporting foot 24 which is held in front of the tool by a pair of adjustable legs 26 mounted on the housing 14. Rather than a permanent spark shield, disposable ferrules can be employed, being held in a similar position by a suitable supporting foot, as is known in the art.

The stud chuck 16 is attached to a chuck leg 28 which is electrically connected by a cable clamp 30 to a main welding cable 32. A rear cable clamp part 34 is attached to the clamp 30 and has a solenoid core 36 affixed thereto. The core 36 moves longitudinally of the tool along with the cable clamp 30 and part 34, the chuck leg 28, the chuck 16, and the stud 18. The core 36 extends into a lifting and holding solenoid coil 38 and is pulled or retracted into the coil when power is supplied through conductors 40 and 42. An adjustable stop 44 at the rear of the coil 38 determines the extent to which the core retracts into the coil and, hence, the extent to which the stud is retracted from the workpiece during the welding cycle. A return or plunge spring 46 plunges the stud back to the workpiece after a main welding arc has been established therebetween for a period of time, and after the power to the coil 38 is shut off.

The stud welding cycle is initiated when a trigger 48 is pressed and continues to completion, whether the trigger is immediately released or is held beyond the end of the welding cycle. The welding cycle is controlled through a welding cycle control circuit 50 with weld power supplied from a weld power source 52, usually both being located in one cabinet at a remote stationary location from the welding tool 10. The welding power circuit is completed through a ground line 54 at the workpiece and a ground line 56 at the welding power source 52. The additional components of the welding controls 12 can be located in one module which is in the cabinet or mounted thereon and electrically connected with the welding cycle control circuit 50.

The distance from the tool 10 to the controls 12 can be considerable, often exceeding one hundred feet when the equipment is used at construction sites, by way of example. Heretofore, four conductors or wires were required between the tool and the welding controls 12 in addition to the main welding cable 32. Two wires were required between the start switch of the tool and the remote controls to initiate the welding cycle and two wires were necessary to carry power to the solenoid coil 38 to control movement of the stud during the welding cycle.

With the present invention, only two conductors or wires are required between the tool and the controls. The use of only two wires reduces the cost of the equipment, especially where long wires are required. The elimination of two of the wires enables the tool to be maneuvered more easily with less weight involved. Damage to the wires is also not uncommon, particularly at construction sites and similar applications, so that maintenance and replacement costs are accordingly reduced. There is also less likelihood that the wires will be improperly connected when only two are employed. Damage to the equipment is consequently reduced.

When the welding cycle is to be initiated, the stud is pressed against the workpiece until the spark shield 22 contacts the workpiece. When the trigger 48 is then pressed, the solenoid coil 38 is energized to retract the core 36 into the coil and retract the chuck leg 28, the chuck 16, and the stud 18 from the workpiece. A pilot arc is established at this time between the stud and the workpiece and a main welding arc is subsequently imposed on the pilot arc. The coil 38 is then deenergized after a predetermined period of time, and a plunge spring 46 moves the core 36, the chuck leg 28, the chuck 16, and the stud 18 back toward the workpiece. The main welding arc is usually maintained until the stud contacts the workpiece. This assures that molten metal on the end of the stud and on the workpiece remain molten until contact is made, at which time the molten metal solidifies to complete the weld.

The overall control system consists of a low voltage source of power PS which is preferably AC, but can be DC if of the indicated polarity, responsive means in the form of a low current sensing circuit indicated at SC in dotted lines, and blocking diodes D1 and D2 located in the welding tool 10.

When the trigger 48 is pressed, it closes contacts of a start switch 58. A circuit is thereby completed from the power source PS through wires or conductors 60 and 62, a limiting resistor R1 and a blocking diode D1 in a wire 64, and a wire or conductor 66. The wires or conductors 60 and 66 are the only ones connecting the welding tool 10 with the welding controls 12. A voltage is thereby impressed across a capacitor C1 that is rectified by a diode D3 with current limited by a resistor R2.

The blocking diode D2 prevents the current from flowing through the solenoid coil 38 and a diode D4 prevents the control voltage from appearing in the welding cycle control circuit 50. A Zener diode ZD clamps the voltage on the capacitor C1 to safe levels.

The voltage across the capacitor C1 is impressed across the low current sensing circuit SC. This circuit comprises a unijunction pulse circuit and an optical-coupled silicon-controlled rectifier. A capacitor C2 in the circuit SC is charged through a resistor R3 to the firing point of a unijunction transistor U1. When the transistor U1 is turned on, it causes the capacitor C2 to discharge through a light-emitting diode OPTe, causing it to emit a burst of infrared light. A photosensitive silicon controlled rectifier OPTd, which is actually in the same package with the diode OPTe and is part of the sensing circuit SC, detects this light and turns on. The rectifier OPTd is connected to the initiation circuitry of the welding cycle control circuit 50 and starts the welding sequence.

When the welding cycle starts, current flows through a conductor 68, the diode D4, the wire or conductor 60, the conductor 40, diode D2 and the solenoid 38. The circuit is completed back through the conductor 42, the wire or conductor 66, and the control circuit 50. This provides current to actuate the solenoid and to lift the stud 18 during the welding cycle. A diode D5 and a resistor R4 across the coil 38 provide a free-wheeling clamp to protect the control circuitry. The resistor R2 limits the current from the solenoid supply during the welding cycle to protect the power supply PS.

The sensing circuit SC may be replaced by other low current requirement relaying circuits, such as a sensitive relay or solid state switch capable of initiating the welding cycle control circuit 50.

When an AC power source is employed, red and green light-emitting diodes RD and GD are connected into the controls 12 to indicate conditions of the electrical equipment. A resistor R5 limits the current to these diodes. If there is a break in the circuit, neither of the diodes is on. If the circuit is properly connected, the green diode is on. If the control wires 64 and 66 are reversed, the red diode is on. When both diodes are on, the light appears orange because the diodes are closely located in a small container. This indicates that there is a short in the circuitry. Both diodes are also on when the trigger 48 is pressed and the welding cycle begins.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In stud welding apparatus for welding studs to workpieces, said apparatus comprising a welding tool having means for holding a stud, an electrical solenoid, a solenoid core connected to said stud holding means, a start switch, a welding cable electrically connected to said stud holding means independently of said solenoid coil, welding cycle controls remote from said stud welding tool having means for controlling the supply of power to said coil independently of the length of time said start switch is closed, means for supplying power to said welding cable independently of said solenoid coil to establish an arc between the stud and the workpiece when spaced apart, and means responsive to the closing of said start switch to cause said controlling means to initiate a welding cycle, the improvement comprising only two wires connecting said responsive means to said start switch and said controlling means to said start switch, whereby the same two wires connect said responsive means to said controlling means.

2. Stud welding apparatus according to claim 1 characterized by said responsive means being electrically connected in parallel with said controlling means.

3. In stud welding apparatus for welding studs to workpieces by a drawn-arc technique, said apparatus comprising a welding tool having means for holding a stud, an electrical solenoid coil, a solenoid core connected to said stud holding means, a start switch, a weld cable electrically connected to said stud holding means, and controls remote from said stud welding tool having means for controlling the supply of power to said coil, means for supplying power to said welding cable to establish an arc between the stud and the workpiece when spaced apart, and means responsive to the closing of said start switch to cause said controlling means to initiate a welding cycle, the improvement comprising conductor means in said welding tool electrically connecting said solenoid coil and contacts of said start switch, means in said conductor means enabling current to flow through said coil only in one direction and for enabling current to flow through said start switch only in the opposite direction, and only two wires connected between said conductor means and said responsive means, whereby both wires carry the controlling current and the solenoid coil current.

4. Stud welding apparatus according to claim 3 chararcterized by conducting means connecting said responsive means in parallel with said controlling means.

5. Stud welding apparatus according to claim 3 characterized by two light-emitting diodes electrically connected in opposite directions across said wires and effective to indicate three conditions of said apparatus.

6. Stud welding apparatus according to claim 3 characterized by a first light-emitting diode electrically connected across said wires in one direction to indicate a condition of said apparatus, a second light-emitting diode electrically connected in the opposite direction across said wires to indicate a second condition of said apparatus, and said diodes being effective to both light to indicate a third condition of said apparatus.

7. In stud welding apparatus for welding studs to workpieces, said apparatus comprising a welding tool having means for holding the studs, an electrical solenoid coil connected to said stud holding means, a start switch, a weld cable electrically connected to said stud holding means, and a welding cycle control circuit remote from said stud welding tool having means for controlling the supply of power to said solenoid coil, means for supplying power to said welding cable to establish an arc between the stud and the workpiece, when spaced apart, and means responsive to the closing of said start switch to initiate a welding cycle, the improvement comprising conducting means connecting said responsive means in parallel with said controlling means, conductor means in said welding tool electrically connecting said start switch in parallel with said solenoid coil, diode means in said conductor means for enabling current to flow through said coil only in one direction and for enabling current to flow through said start switch only in the opposite direction, and only two wires connection said conductor means and said responsive means, whereby both wires carry the controlling current and the solenoid coil current.

8. Apparatus according to claim 7 characterized by a power source being connected in series with said responsive means across said two wires.

9. Apparatus according to claim 7 characterized by said responsive means comprising an optical-coupled silion-controlled rectifier.

10. Stud welding apparatus according to claim 7 characterized by said responsive means comprising a light-emitting diode, and a unijunction transistor in series with said diode to cause it to be energized when said unijunction transistor is turned on.

11. Apparatus according to claim 7 characterized by said responsive means comprising a low current requirement relaying circuit.

12. Apparatus according to claim 7 characterized by a first light-emitting diode electrically connected across said wires in one direction to indicate that the wires are properly connected, a second light-emitting diode electrically connected across said wires in the opposite direction to indicate that the wires are improperly connected, both of said diodes being lighted when there is a short in the welding circuitry.

13. In stud welding apparatus for welding studs to workpieces, said apparatus comprising a welding tool having means for holding a stud, an electrical solenoid coil, a solenoid core connected to said stud holding means, a start switch, a welding cable electrically connected to said stud holding means, welding cycle controls remote from said stud welding tool having means for controlling the supply of power to said coil, means for supplying power to said welding cable to establish an arc between the stud and the workpiece when spaced apart, and means responsive to the closing of said start switch to cause said controlling means to initiate a welding cycle, the improvement comprising only two wires connecting said responsive means to said start switch and said controlling means to said start switch, whereby the same two wires connect said responsive means to said controlling means, and two light-emitting diodes electrically connected in opposite directions across said wires to indicate three conditions of said apparatus.

14. In stud welding apparatus for welding studs to workpieces, said apparatus comprising a welding tool having means for holding a stud, an electrical solenoid coil, a solenoid core connected to said stud holding means, a start switch, a welding cable electrically connected to said stud holding means, welding cycle controls remote from said stud welding tool having means for controlling the supply of power to said coil, means for supplying power to said welding cable to establish an arc between the stud and the workpiece when spaced apart, and means responsive to the closing of said start switch to cause said controlling means to initiate a welding cycle, the improvement comprising only two wires connecting said responsive means to said start switch and said controlling means to said start switch, whereby the same two wires connect said responsive means to said controlling means, a light-emitting diode connected in one direction across said wires to indicate a condition of said apparatus, and a second light-emitting diode connected in an opposite direction across said wires to indicate another condition of said apparatus, said light-emitting diodes being effective to both light to indicate a third condition of said apparatus.

* * * * *

UNITED STATES PATENT OFFICE
CERTIFICATE OF CORRECTION

PATENT NO. : 4,594,495

DATED : June 10, 1986

INVENTOR(S) : Paul A. Glorioso

It is certified that error appears in the above-identified patent and that said Letters Patent are hereby corrected as shown below:

Column 2, line 5, "feed" should be --feet--.

Signed and Sealed this

Nineteenth Day of August 1986

[SEAL]

Attest:

DONALD J. QUIGG

Attesting Officer

Commissioner of Patents and Trademarks